United States Patent
Vicario Burgos et al.

(10) Patent No.: US 9,700,943 B2
(45) Date of Patent: Jul. 11, 2017

(54) ANTI-VIBRATION PLUG FOR MECHANISING TUBES AND METHOD FOR PLACING SAID PLUG INSIDE A TUBE

(71) Applicant: DANOBAT, S. COOP., Elgoibar (Guipuzcoa) (ES)

(72) Inventors: Angel M. Vicario Burgos, Elgoibar (ES); Jokin Munoa Gorostidi, Zumaia (ES)

(73) Assignee: DANOBAT, S. COOP., Elgoibar (Guipuzcoa) (ES)

( * ) Notice: Subject to any disclaimer, the term of this patent is extended or adjusted under 35 U.S.C. 154(b) by 113 days.

(21) Appl. No.: 14/785,791

(22) PCT Filed: Dec. 5, 2013

(86) PCT No.: PCT/ES2013/070851
§ 371 (c)(1),
(2) Date: Oct. 20, 2015

(87) PCT Pub. No.: WO2014/174127
PCT Pub. Date: Oct. 30, 2014

(65) Prior Publication Data
US 2016/0067784 A1   Mar. 10, 2016

(30) Foreign Application Priority Data

Apr. 22, 2013 (ES) .................... 201330581

(51) Int. Cl.
*B23B 5/08* (2006.01)
*B23B 25/00* (2006.01)
(Continued)

(52) U.S. Cl.
CPC ............... *B23B 25/00* (2013.01); *B23B 5/08* (2013.01); *B23B 5/14* (2013.01); *B23B 5/16* (2013.01);
(Continued)

(58) Field of Classification Search
CPC .... B23B 5/08; B23B 5/14; B23B 5/16; B23B 5/161; B23B 5/162; B23B 25/04;
(Continued)

(56) References Cited

U.S. PATENT DOCUMENTS 1,823,959 A * 9/1931 Steinmayer ............. B23B 5/162
144/205
1,966,819 A * 7/1934 Irvin ..................... B08B 9/0553
137/1
(Continued)

FOREIGN PATENT DOCUMENTS

DE  102011119098 A1 * 5/2013 ............. B23B 25/00
ES  2361988 A1  6/2011

OTHER PUBLICATIONS

International Search Report dated Mar. 7, 2014 for PCT/ES2013/070851 and English translation.

*Primary Examiner* — Daniel Howell
*Assistant Examiner* — Nicole N Ramos
(74) *Attorney, Agent, or Firm* — Lucas & Mercanti, LLP

(57) ABSTRACT

The invention relates to an anti-vibration plug for machining tubes and to a method for placing said plug inside a tube, wherein the plug comprises a central body (2) with arms (3) that open radially outwards intended to come into contact with the inside of the tube (1), a blocking screen (4) being arranged between the central body (2) and the arms (3), which blocks the inside of the tube (1) in the open position of the arms (3), whereas the central body (2) has an axial hole (5) wherein there is housed a piston (6) which movably acts on a peripheral part (8) which surrounds the central body (2) and generates the movement of the arms (3), the peripheral part (8) being subjected to a pushing force exerted by an elastic element (10) in the opposite direction to that in which the piston (6) pushes.

5 Claims, 3 Drawing Sheets

(51) Int. Cl.
  *B23B 5/16* (2006.01)
  *B23B 5/14* (2006.01)
(52) U.S. Cl.
  CPC ........... *B23B 5/162* (2013.01); *B23B 2215/64* (2013.01); *B23B 2215/72* (2013.01); *B23B 2250/16* (2013.01); *B23B 2260/126* (2013.01); *Y10T 82/22* (2015.01); *Y10T 82/2572* (2015.01); *Y10T 82/2595* (2015.01)
(58) Field of Classification Search
  CPC ........... B23B 2215/72; B23B 2250/16; B23B 2260/058; B23B 2270/30; B23Q 11/08; B23Q 11/0032; B23Q 11/0042; B23Q 11/0816; B23Q 11/085; B23Q 11/0866; Y10T 82/22; Y10T 82/2572; Y10T 82/2595; Y10T 82/30
  See application file for complete search history.

(56) References Cited

U.S. PATENT DOCUMENTS

| | | | | |
|---|---|---|---|---|
| 2,246,237 A | | 6/1941 | Benninghoff | |
| 2,256,775 A | * | 9/1941 | Hubbell | F16L 55/1283 137/800 |
| 2,607,376 A | * | 8/1952 | Montgomery | B28D 1/227 125/10 |
| 2,615,413 A | * | 10/1952 | Adams | B23K 37/0531 228/44.5 |
| 2,793,553 A | * | 5/1957 | Mathews | B23B 5/162 82/128 |
| 3,086,783 A | | 4/1963 | Kelso | |
| 3,171,309 A | * | 3/1965 | Cloutier | B23B 5/162 82/128 |
| 3,187,738 A | * | 6/1965 | Christopher | B23D 45/124 125/13.01 |
| 3,222,960 A | * | 12/1965 | Gill | B23B 31/40 144/205 |
| 3,330,021 A | * | 7/1967 | Jacobsen | B23K 37/0531 228/44.5 |
| 3,330,366 A | | 7/1967 | Lowry et al. | |
| 3,755,908 A | * | 9/1973 | VerNooy | G01M 3/005 33/542 |
| 3,835,738 A | * | 9/1974 | Kellum | B23B 5/162 82/1.2 |
| 3,885,521 A | * | 5/1975 | von Arx | B05C 7/08 118/105 |
| 4,462,430 A | * | 7/1984 | Anthony | F16L 55/1283 138/89 |
| 4,964,759 A | * | 10/1990 | Guzzetta | B23B 39/16 166/55.7 |
| 5,076,025 A | * | 12/1991 | Reeble | B23B 5/162 269/48.1 |
| 5,884,379 A | * | 3/1999 | Lombardi | B23B 5/162 29/27 C |
| 6,755,101 B1 | * | 6/2004 | Waring | B23B 5/162 408/79 |
| 7,328,475 B2 | * | 2/2008 | Smith | F16L 55/28 134/8 |

* cited by examiner

ANTI-VIBRATION PLUG FOR MECHANISING TUBES AND METHOD FOR PLACING SAID PLUG INSIDE A TUBE

CROSS REFERENCE TO RELATED APPLICATIONS

This Application is a 371 of PCT/ES2013/070851 filed on Dec. 5, 2013 which, in turn, claimed the priority of Spanish Patent Application No. P201330581 filed on Apr. 22, 2013, both applications are incorporated herein by reference.

FIELD OF THE ART

The present invention relates to lathe machining of tubes that are used for conveying fluids in the oil and gas industry, proposing a plug that attenuates vibrations and keeps the tube plugged during the machining process.

PRIOR ART

Conveying fluids such as oil or gas is done through tubes called "OCTG" (Oil Country Tubular Goods), which are formed by sections usually having lengths greater than 10 meters and weights greater than a ton, which makes handling them complicated, and as a result, for machining these sections of tube, they are arranged in special lathes, by means of which threading of the ends of the tubes for connection attachments between some sections of tube with others is carried out.

During that threading process, the inside of the tube is normally filled with residual elements that come from machining, such as cutting fluid, shavings, etc.; whereas, when the tubes have little wall thickness, vibrations occur due to a bell effect caused by the tube itself.

Solutions which consist of placing a stopper inside the tube, for the purpose of preventing the inlet of residues into same, thereby also reducing vibrations, are known to prevent those drawbacks.

Spanish patent ES 2,361,988, belonging to the same applicant as the present invention, discloses a stopper having these features. The stopper is formed by first and second annular bodies facing one another, and between which there is arranged a piston which allows axially separating said annular bodies. The first annular body has an elastic ring on its periphery that can expand outwardly until coming into contact with the inner wall of the tube. The expansion of the elastic ring occurs due to the compressive force exerted by a spring through a part which is axially integral with the second annular body.

This solution solves the problem of vibrations and of the entrance of residues inside the tube, but it is limited to inner diameters of specific tubes, since the elastic ring has a limited expansion capacity, a stopper with a different elastic ring thickness according to the inner diameter of the tube to plug being necessary.

A plug for being placed inside tubes which allows being automatically adapted to tubes with different inner diameters is therefore necessary.

OBJECT OF THE INVENTION

According to the present invention, a plug is proposed that is intended for being inserted inside a tube machined in a lathe, the plug being independent inside the tube when machining occurs, the entrance of residues coming from machining inside the tube being prevented, while at the same time mitigating vibrations occurring in the tube while machining, and where the plug has a structural embodiment that allows it to be adapted to tubes having different inner diameters.

The plug object of the invention comprises a central body having at least three arms that open radially outwards, intended to come into contact with the inner wall of the tube to be machined. A blocking screen is arranged between the central body and the arms, which blocks the inside of the tube in the open position of the arms such that when the radial opening of the arms occurs, the plug goes from a non-plugging position to a plugging position for plugging the inside of the tube.

The central body has an axial hole wherein there is housed a piston which, by means of an external operating push, movably acts on a peripheral part which surrounds the central body and generates the movement of the arms, said peripheral part being subjected to a compressive force exerted by an elastic element pushing said peripheral part in the opposite direction to that in which the piston pushes. The piston has at one end a transverse bar which is attached to the peripheral part, the transverse bar projecting with respect to the central body through an oblong groove made in said central body.

According to a non-limiting embodiment of the invention, each arm of the central body of the plug has a scissor shape, comprising a first lever and a second lever articulated to one another. The first lever is attached at one end to the central body, whereas at the other end it is attached to a moveable point which moves along a groove defined in an elongated stop part intended to come into contact with the inner wall of the tube. The second lever is attached at one end to the peripheral part and at the other end it is attached to the elongated stop part such that when movement of the peripheral part occurs, a raising of the elongated stop part of the arms occurs, the plug moving to the plugging position for plugging the inside of the tube.

According to another non-limiting embodiment of the invention, the first and second levers end in respective wheels coming into contact with the wall of the inside of the tube, instead of ending in an elongated stop part.

With this being the case, to proceed to place the plug inside a tube, in a first step the plug is secured to a moveable plate of the lathe, the plug being secured by means of clamps of said moveable plate of the lathe and a rod operating the plug keeping it in a non-plugging position with the arms withdrawn, the plug being introduced in this position inside the tube. In a second step the plug is no longer secured by the moveable plate of the lathe, the clamps of said moveable plate of the lathe being removed and the plug no longer being actuated by the rod, such that the plug adopts a plugging position for plugging the inside of the tube, the plug being independent inside the tube.

DETAILED DESCRIPTION OF THE INVENTION

The anti-vibration plug of the invention is intended for being introduced inside one end of a tube (1) to be machined in a lathe for the purpose of mitigating vibrations occurring in the tube (1) while machining, as well as preventing the entrance of cutting fluid, shavings or other residues coming from machining, inside the tube (1).

Figure 3:
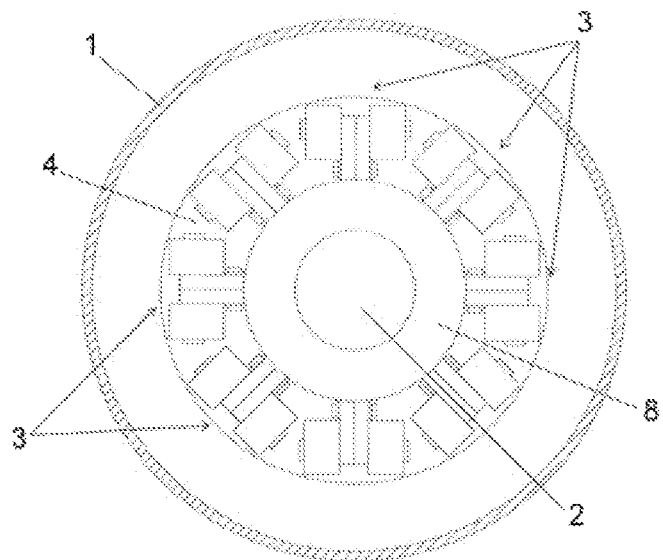
FIG. 3 shows a cross-section view of the tube with the plug in the non-plugging position.
Figure 4:
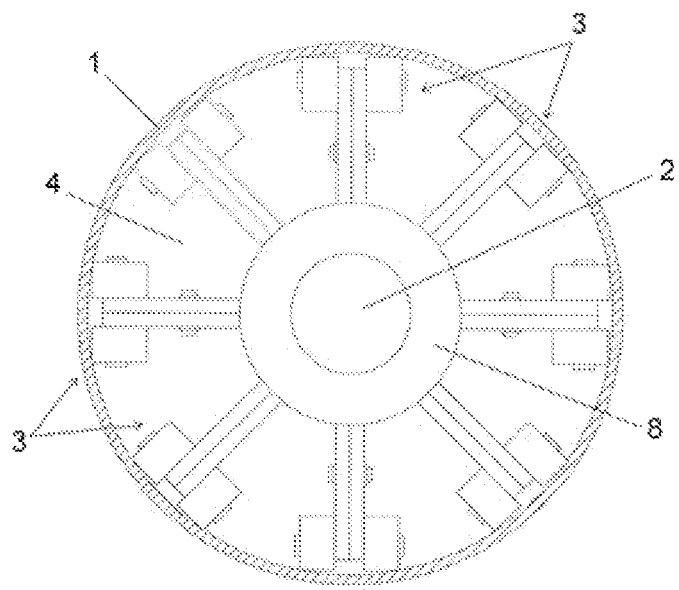
FIG. 4 shows a cross-section view of the tube with the plug in the plugging position.

As can be seen in the embodiments of the drawings, the anti-vibration plug comprises a central body (2) generally in a circular-shaped part, which has on its periphery at least three arms (3) which can be radially extended outwardly with respect to said central body (2) for the purpose of coming into contact with the inner wall of the tube (1) and thereby mitigating vibrations occurring in the tube (1) while machining. As can be seen in the cross-section views of FIGS. 3 and 4, to assure correct attenuation of vibrations occurring in the tube (1) while machining, the possibility of the central body (2) of the plug having eight arms (3) to come into contact with the inner wall of the tube (1) has been provided.

A blocking screen (4) in the form of a flexible sheet is arranged between the outside of the central body (2) and the ends of the arms (3) farthest away from the central body (2), which blocking screen (4) is intended for blocking the inside of the tube (1) in the open position of the arms (3), i.e., in the plugging position when the arms (3) move radially outwards and come into contact with the inner wall of the tube (1).

Figure 5:
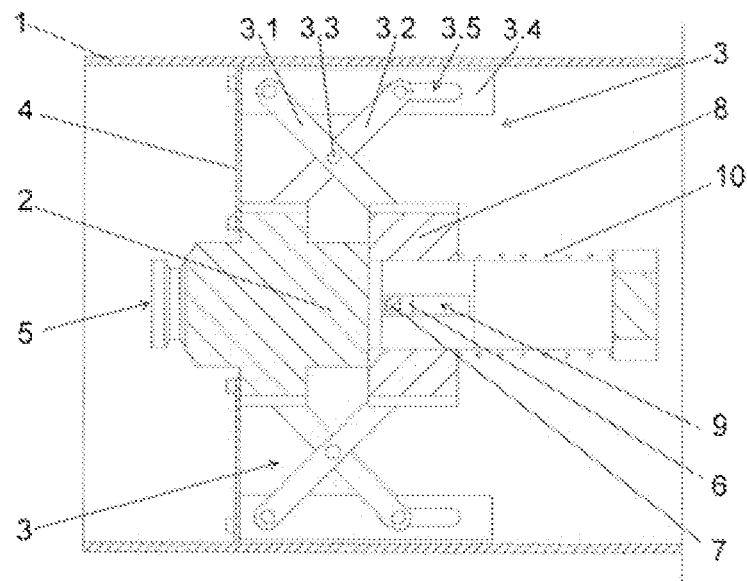
FIG. 5 shows a longitudinal section view of an embodiment of the arms of the plug.

The central body (2) internally has an axial hole (5), wherein there is housed an axially moveable piston (6). The piston (6) has at one of its ends a transverse bar (7) projecting with respect to the central body (2), said transverse bar (7) being integrally attached to a peripheral part (8) which surrounds the central body (2) and axially slides over it, such that said peripheral part (8) slides over the central body (2) by means of axial movement of the piston (6). As can be seen in the longitudinal section view of FIG. 5, the transverse bar (7) of the piston (6) projects from the central body (2) through an oblong groove (9) made in said central body (2). The oblong groove (9) allows the transverse bar (7) to be able to project from the central body (2) and transmit the axial movement of displacement of the piston (6) to the peripheral part (8) and vice versa.

In the embodiments shown in the drawings, the transverse bar (7) projects at its two ends with respect to the central body (2) and is integrally attached to the peripheral part (8) at those two ends, such that the oblong groove (9) through which that transverse bar (7) moves transversely goes through the central body (2), but it is also possible for the transverse bar (7) to only be attached to the peripheral part (8) at one of its ends, or for the transverse bar (7) to be cross-shaped, determining four points of contact with the peripheral part (8), without these embodiments altering the concept of the invention.

An elastic element (10) acts permanently on the peripheral part (8), pushing said peripheral part (8) in the opposite direction to that in which the piston (6) pushes. In the embodiments shown in the drawings, the elastic element (10) is represented as a spring, although it could be another type of device pushing the peripheral part (8), such as pneumatic cylinders, hydraulic cylinders, magnetic plates or another mechanism suitable for such purpose. The axial movement of the peripheral part (8) in the direction in which the elastic element (10) pushes it is limited by a stop (11) in the form of an annular recess defined in the central body (2), against which said peripheral part (8) comes into contact.

As can be seen in the embodiments shown in the drawings, the arms (3) which can be radially extended intended to come into contact with the inner wall of the tube (1) have a scissor shape in one embodiment. Therefore, each of the arms (3) comprises a first lever (3.1) and a second lever (3.2) which are attached substantially in the central portion thereof by an articulated point (3.3), wherein one end of the first lever (3.1) is attached to a fixed point of the central body (2), whereas one end of the second lever (3.2) is attached to the peripheral part (8) which is moveable with respect to the central body (2). The other ends of the first lever (3.1) and of the second lever (3.2) are connected to an elongated stop part (3.4) intended to come into contact with the inner wall of the tube (1). In this case, the second lever (3.2) is attached to a fixed point of the elongated stop part (3.4), whereas the first lever (3.1) is attached to that elongated stop part (3.4) in a moveable point which moves along a groove (3.5) defined in said elongated stop part (3.4).

Figure 6:
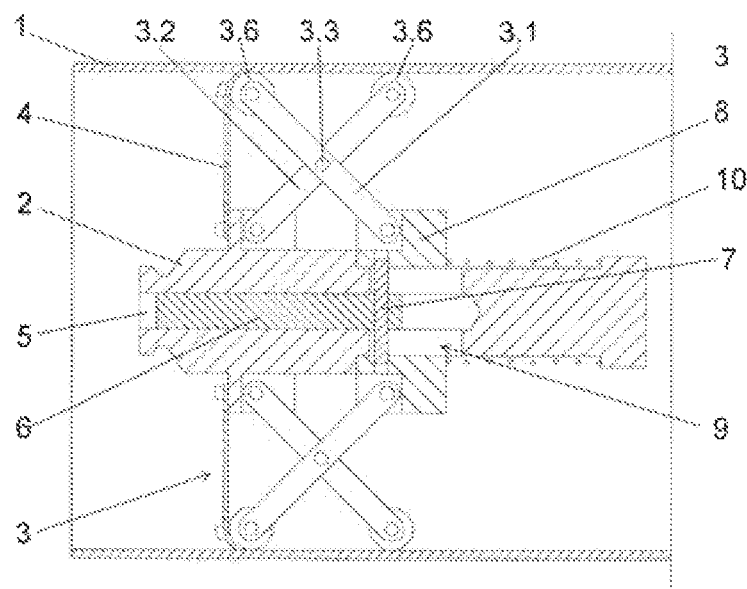
FIG. 6 shows a longitudinal section view of another embodiment of the arms of the plug.

FIG. 6 shows another embodiment of the arms (3), wherein the ends of the first lever (3.1) and of the second lever (3.2) farthest away from the central body (2) end in respective wheels (3.6) acting as a stop upon contact with the inner wall of the tube (1). The embodiments of the arms (3) shown in the drawings are in no case limiting, other different embodiments for the extension of the arms (3) being able to be applied without this altering the concept of the invention.

Figure 1:
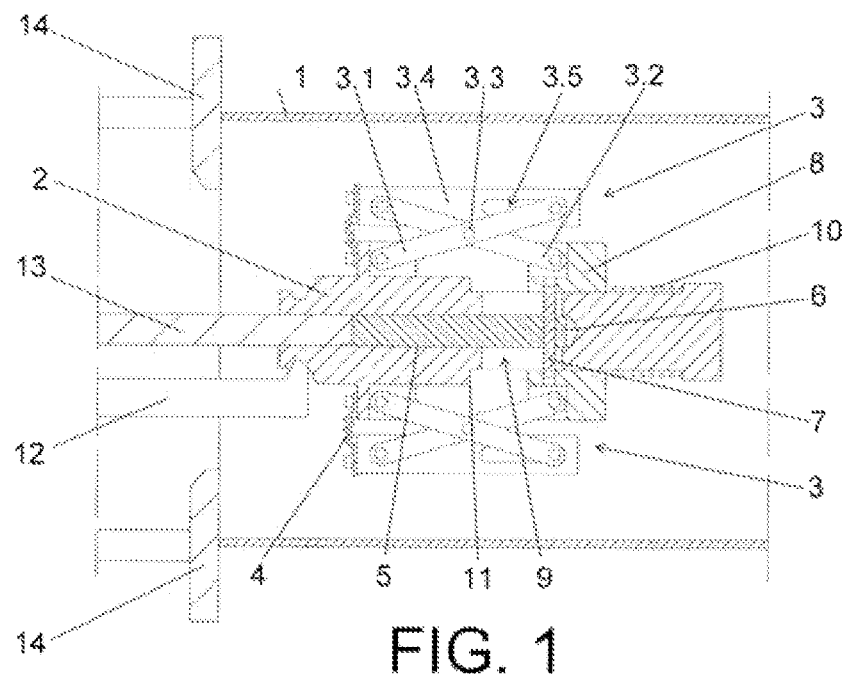
FIG. 1 shows a longitudinal section view of a tube with the plug of the invention in a non-plugging position, the arms of the plug being in a folded position.
Figure 2:
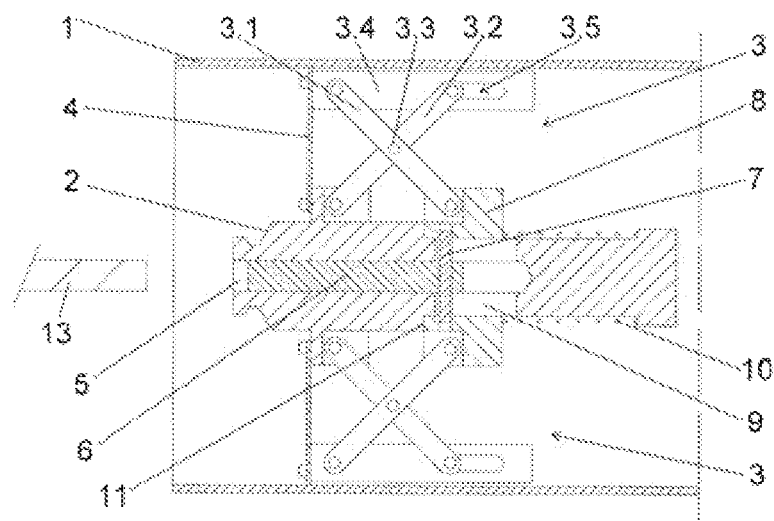
FIG. 2 shows a longitudinal section view of the tube with the plug in the plugging position, the arms of the plug being in a deployed position.

That being the case, the plug is arranged in the lathe in which the tube (1) is to be machined, and the plug is introduced and placed inside the tube (1) by means of a plate of the moveable carriage of the lathe. As can be seen in FIG. 1, the plug is introduced inside the tube (1) in the non-plugging position, with the arms (3) withdrawn. The central body (2) of the plug is then secured by means of clamps (12) of the plate of the lathe and by means of a rod (13) which is introduced in the axial hole (5) of the central body (2). In the non-plugging position, the rod (13) of the lathe pushes the piston (6) and transverse bar (7) assembly, which in turn pushes the peripheral part (8) against the elastic element (10), keeping the arms (3) withdrawn.

When the plug is centered inside the tube (1) and stops (14) of the plate of the lathe come into contact with the mouth of the tube (1), the rod (13) then moves backwards such that the elastic element (10) pushes the peripheral part (8), causing the arms (3) to expand radially outwards until coming into contact with the inner wall of the tube (1). Finally, the clamps (12) of the lathe release the central body (2) and said central body (2) is removed, the plug thereby being independent inside the tube (1).

The invention claimed is:

1. An anti-vibration plug for machining tubes, intended for being inserted inside a tube to be machined, comprising a central body having at least three arms that open radially outwards, to come into contact with the inside of the tube, a blocking screen being arranged between the central body and the arms, which blocks the inside of the tube in the open position of the arms, whereas the central body has an axial hole wherein there is housed a piston which, by means of an external operating push, movably acts on a peripheral part which surrounds the central body and generates the movement of the arms, the peripheral part being subjected to a pushing force exerted by an elastic element in the opposite direction to that in which the piston pushes.

2. The anti-vibration plug for machining tubes according to claim 1, wherein each arm has a scissor shape comprising a first lever and a second lever articulated to one another, the first lever being attached at one end to the central body, whereas at the other end it is attached to a moveable point which moves along a groove defined in an elongated stop part intended to come into contact with the inside of the tube; while the second lever is attached at one end to the peripheral part and at the other end it is attached to the elongated stop part.

3. The anti-vibration plug for machining tubes according to claim 1, wherein each arm has a scissor shape comprising a first lever and a second lever articulated to one another, the first lever being attached to the central body and the second lever being attached to the peripheral part, the free ends of said first lever and of said second lever ending in respective wheels intended to come into contact with the inside of the tube.

4. The anti-vibration plug for machining tubes according to claim 1, wherein the piston has at one end a transverse bar which is attached to the peripheral part, said transverse bar projecting with respect to the central body through an oblong groove thereof.

5. A method for placing the anti-vibration plug of claim 1 inside a tube to be machined in a lathe, comprising in a first step, securing the plug is secured to a moveable plate of the lathe, the plug being secured by means of clamps of the moveable plate of the lathe and a rod operating the plug, keeping it in a non-plugging position, the plug being introduced inside the tube in this position; and a second step, no longer securing the plug to the moveable plate of the lathe, the clamps of the moveable plate of the lathe being removed and the plug no longer being actuated by the rod, so the plug adopts a plugging position for plugging the tube, being independent inside the tube.

* * * * *